US008024169B2

(12) United States Patent
Galgali et al.

(10) Patent No.: US 8,024,169 B2
(45) Date of Patent: Sep. 20, 2011

(54) STORAGE AREA NETWORK MANAGEMENT MODELING SIMULATION

(75) Inventors: Pallavi Vyankatesh Galgali, Maharashtra (IN); Sandeep Gopisetty, Morgan Hill, CA (US); Amit Sunil Modi, Pune (IN); Ramani Ranjan Routray, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 661 days.

(21) Appl. No.: 12/108,223

(22) Filed: Apr. 23, 2008

(65) Prior Publication Data

US 2009/0271415 A1   Oct. 29, 2009

(51) Int. Cl.
*G06F 9/44* (2006.01)
(52) U.S. Cl. ......................................... 703/21
(58) Field of Classification Search .................... 703/21; 709/202, 220, 223; 711/100
See application file for complete search history.

(56) References Cited

U.S. PATENT DOCUMENTS

| 7,171,417 | B2 | 1/2007 | Chen et al. | |
| 7,315,807 | B1 * | 1/2008 | Lavallee et al. | 703/21 |
| 7,536,291 | B1 * | 5/2009 | Vijayan Retnamma et al. | 703/21 |
| 2006/0106863 | A1 | 5/2006 | Ramasamy Venkatraj et al. | |
| 2007/0050686 | A1 * | 3/2007 | Keeton et al. | 714/48 |
| 2007/0073877 | A1 | 3/2007 | Boykin et al. | |

FOREIGN PATENT DOCUMENTS

EP    1 615 126 A2    1/2006

* cited by examiner

*Primary Examiner* — Jason Proctor
*Assistant Examiner* — Andre Pierre Louis
(74) *Attorney, Agent, or Firm* — Dillon & Yudell LLP

(57) ABSTRACT

A method, system and computer program product are disclosed for simulating a storage area network including a set of correlated devices, each of the devices having a device agent. The method comprises the step of forming a set of simulation agents representing said device agents, including the steps of, (i) for each of the simulation agents, obtaining a set of agent profiles, and storing said agent profiles in a data store, and (ii) obtaining files describing class definitions for the simulation agents, and storing said files in the data store. With this information and data, a Visual Workbench is used to generate a display of said simulation agents. The preferred embodiment provides a framework and implementation that simulates the CIM agent of any SAN device. Each individual device CIM agent can be simulated in this framework based on the specification defined in an XML file and/or through snapshot mechanism.

16 Claims, 5 Drawing Sheets

ARCHITECTURE OF STORAGE NETWORK SIMULATOR

REPRESENTATION OF A STORAGE AREA NETWORK WHERE SERVERS (SUCH AS FILE AND PRINT SERVERS, EMAIL SERVERS AND DATABASE SERVERS) ACCESS DATA STORAGE IN SUBSYSTEMS AND TAPE LIBRARIES VIA HOST BUS ADAPTERS OVER A SWITCHED NETWORK

ARCHITECTURE OF STORAGE NETWORK SIMULATOR

SAMPLE SAN WITH NO SINGLE POINT OF FAILURE CONNECTIVITY

STORAGE AREA NETWORK MANAGEMENT MODELING SIMULATION

BACKGROUND OF THE INVENTION

1. Field of the Invention

The present invention generally relates to storage area network management, and more specifically, to storage area network management modeling simulation.

2. Background Art

Enterprise IT environment management is comprised of server, storage and network management. Storage resources management and Storage Area Network (SAN) management is the major part of any large-scale data centric enterprise. Basic structure of a SAN is represented in FIG. 1. FIG. 1 shows a storage area network (SAN) 100, a series of clients 102, and data storage 104. The clients, which may be, for example, personal computers or workstations, are connected to SAN 100 via a local area network 106; and SAN 100 is connected to a group of servers including file and print server 110, email server 112, and database server 114. FIG. 1 also shows a tape library 116 and management software 120 connected to the SAN 100.

Typically, SAN management software is comprised of basic components like discovery, control, monitoring, planning and reporting. Advanced analytics like predictive analysis, problem determination are built on top. Considering the heterogeneous and multi-vendor nature of the environment, performing the above tasks in a uniform fashion is a big challenge.

To address these challenges and bring in uniformity and interoperability, the Distributed Management Task Force (DMTF) and the Storage Networking Industry Association (SNIA) have come up with several standards like the Common Information Model (CIM), the Storage Management Interface-Standard (SMI-S) and the Web Based Enterprise Management (WBEM). Based on these standards, most of the SAN devices like Storage Subsystems, Tape Libraries and Fiber Channel Switches are shipped with a management module called Common Information Model (CIM) agent. For some devices, CIM agent is embedded in the device and for other devices, it is externally installed on a server. Popular systems management products like IBM TotalStorage Productivity Center (TPC), HP AppIQ, EMC Control Center exploit the above technologies to achieve their functionality. These tools also use SNMP and proprietary management methods in conjunction with CIM agent.

CIM agent is generally comprised of Common Information Model Object Manager (CIMOM) and a set of provider(s). CIMOM is the basic server infrastructure. Some popular open source CIMOMs are Pegasus, Sun WBEM and SNIA. Provider is the pluggable library that realizes the CIM profiles by serving the requested information out from the device.

Storage Management plays an important role in ensuring the service level agreements (availability, reliability, performance etc.) that are critical to the operation of resilient business IT infrastructure. Also, Storage Resource Management (SRM) is becoming the largest component in the overall cost of ownership of any large enterprise IT environment. Considering these functional requirements and business opportunities, several SRM suites have cropped up in the market place to provide uniform and interoperable management. But, development and test of these suites require access to huge set of heterogeneous multivendor Storage Area Network (SAN) devices like Fiber Channel Switches, Storage Subsystems, Tape Libraries, Servers etc. . . . It's almost impractical for a SRM Suite software manufacturer to own and manage these huge varieties of devices.

SRM vendors spend huge amount of money in setting up heterogeneous environment to develop and test their software or access geographically distributed heterogeneous environments over network. SNIA also hosts such a lab for interoperability and certification testing.

Administrators also do not have access to any standard primitives that can help them perform impact analysis before they deploy new hardware or perform certain configuration change operation on their SAN.

SUMMARY OF THE INVENTION

An object of this invention is a simulation framework for storage area network management.

A further object of this invention is to provide a framework and implementation that models the management module of SAN devices.

A further object of the invention is a tool that provides efficiency and cost-effectiveness with respect to development, test of Storage Resource Management suites and planning of IT environment by removing their dependence on high cost SAN hardware.

Yet a further object of the present invention is to provide correlated multi-device simulation for a whole networked storage environment setup.

These and other objectives are attained with a method and system for simulating a storage area network including a set of correlated devices, each of the devices having a device agent. The method comprises the step of forming a set of simulation agents representing said device agents, including the steps of, (i) for each of the simulation agents, obtaining a set of agent profiles, and storing said agent profiles in a data store, and (ii) obtaining files describing class definitions for the simulation agents, and storing said files in the data store. With this information and data, a Visual Workbench is used to generate a display of said simulation agents.

The preferred embodiment of the invention, described in detail below, provides a framework and implementation that simulates the CIM agent of any SAN device. Each individual device CIM agent can be simulated in this framework based on the specification defined in a XML file. Based on user-supplied specification, multiple CIM agents can be simulated that combined together represent a SAN. In this case, information exposed by simulated CIM agents need to be correlated to one another to virtually represent a SAN from management modeling perspective. This embodiment of the invention uses database for storing device configuration details, a standard set of providers and a service for generating and correlating data across CIM agents. Modeling and implementation of profiles like fabric profile, array profile, server profile etc. . . . in correlated and temporal fashion provides a completely virtual SAN.

In the preferred implementation, the present invention obtains input about the required SAN environment through a visual workbench and generates a set of correlated CIM agent(s). Two approaches, referred to as the snapshot approach and the configuration approach, may be used to generate the virtual SAN environment. In the snapshot approach, a user can take a snapshot of a set of device CIM agent(s) that represent a real live SAN. Snapshot can be done for (i) the set of CIM agent(s), (ii) all device(s) reported by a CIM agent(s), and (iii) a subset of device(s) reported by a CIM agent. In the configuration approach, the user can specify the configuration of the required SAN environment.

The required data and the CIM agent(s) are then generated from the user specified configuration.

By simulating CIM agents of multiple SAN devices in a collective fashion, virtual SAN can be exposed to a SRM suite. SRM suites can use the Storage Network Simulator of this invention for the following purposes: visual workbench to drag and drop different devices and connect them together to get a virtual SAN from management perspective; SRM suite can perform regular management functions like discovery, configuration and monitoring on the virtual SAN as if it is a real SAN; planning of a SAN from scratch or extension of an existing SAN in a virtual environment to perform what-if-analysis; impact analysis against fault injection or growth pattern in a temporal fashion; minimize network latency by presenting a virtual SAN close to the management server; and snapshot any real live CIM agent and replay it using the Storage Network Simulator's record-replay mechanism.

It is important to note that the virtual SAN with the above features brings in significant value add to the management suite because these tools never really require the existence of a real heterogeneous SAN for it's development and testing.

Further benefits and advantages of this invention will become apparent from a consideration of the following detailed description, given with reference to the accompanying drawings, which specify and show preferred embodiments of the invention.

DETAILED DESCRIPTION OF THE PREFERRED EMBODIMENTS

The preferred embodiment of the invention, refereed to as the Storage Network Simulator, provides a framework and implementation that simulates the CIM agent of any SAN device. Each individual device CIM agent can be simulated in this framework based on the specification defined in a XML file. Based on user-supplied specification, multiple CIM agents can be simulated that combined together represent a SAN. In this case, information exposed by simulated CIM agents need to be correlated to one another to virtually represent a SAN from management modeling perspective. This embodiment of the invention uses database for storing device configuration details, a standard set of providers and a service for generating and correlating data across CIM agents. Modeling and implementation of profiles like fabric profile, array profile, server profile etc. . . . in correlated and temporal fashion provides a completely virtual SAN.

Generally, the Storage Network Simulator obtains input about the required SAN environment through a visual workbench and generates a set of correlated CIM agent(s). the Storage Network Simulator's generation of virtual SAN environment is classified into two broad categories referred to as the snapshot approach and the configuration approach.

Snapshot Approach

Using this approach, user can take snapshot of a set of device CIM agent(s) that represent a real live SAN. Snapshot image is then replayed through the Storage Network Simulator.

This approach helps minimize the network latency (e.g., users accessing SNIA lab over WAN can run the exact same set of device CIM agents from their local LAN). Also, users can extend the snapshot through the visual workbench and perform what-if-analysis. In this approach, data from one or more CIM agent is retrieved by traversing the profiles. All the retrieved information is persisted in the Storage Network Simulator device configuration repository. Managed Object Format (MOF) files describing CIM class definitions are also queried from real live CIM agents and compiled into the simulated CIM agents of the Storage Network Simulator.

Configuration Approach

Using this approach, user can specify the configuration of the required SAN environment. The Storage Network Simulator generates the required data and hosts the CIM agent(s) that represents the virtual SAN environment. Data generation in this approach is governed by device templates. Templates are, basically, standard definitions of CIM implementations and definitions for a given device from a particular manufacturer. Following subsections describe individual.

Figure 1:
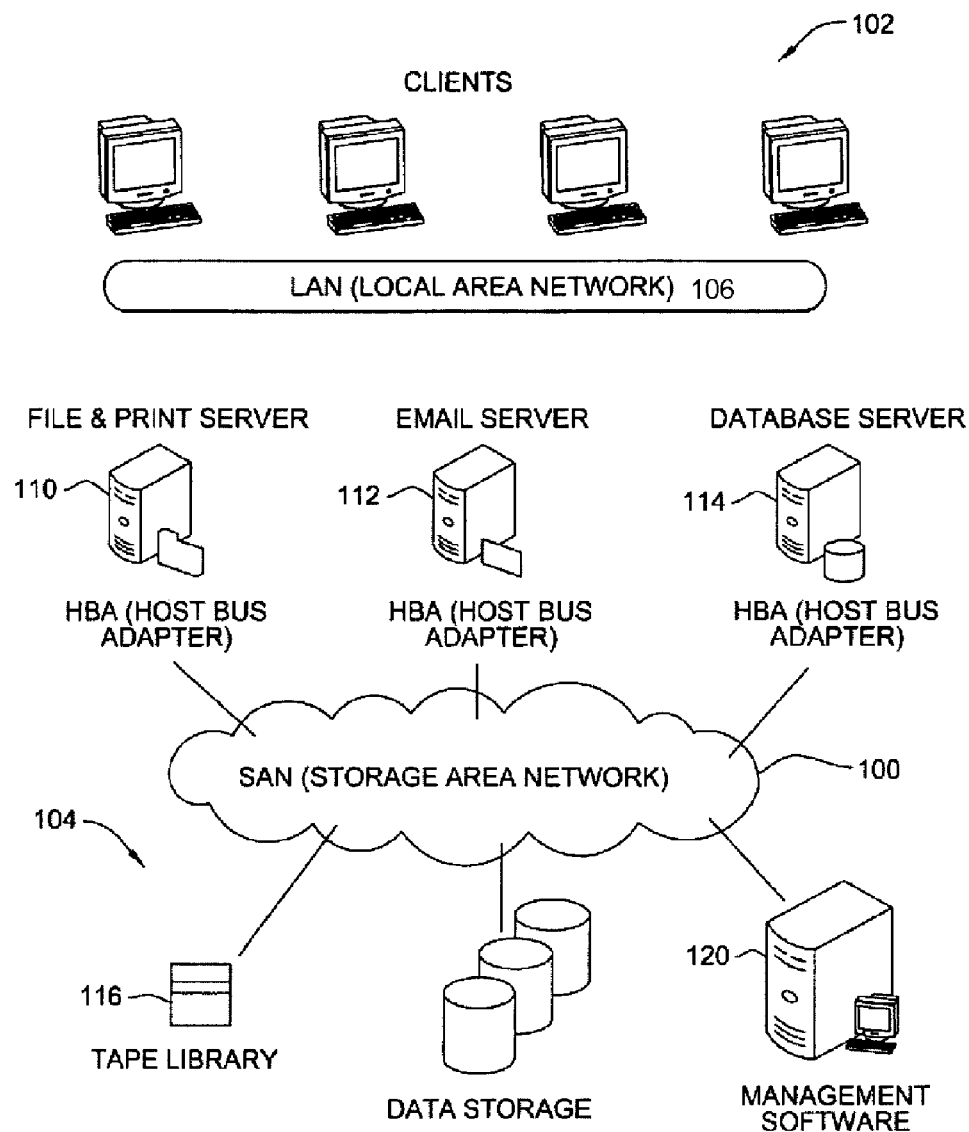
FIG. 1 represents a storage area network where servers access data storage in subsystems and tape libraries.
Figure 2:
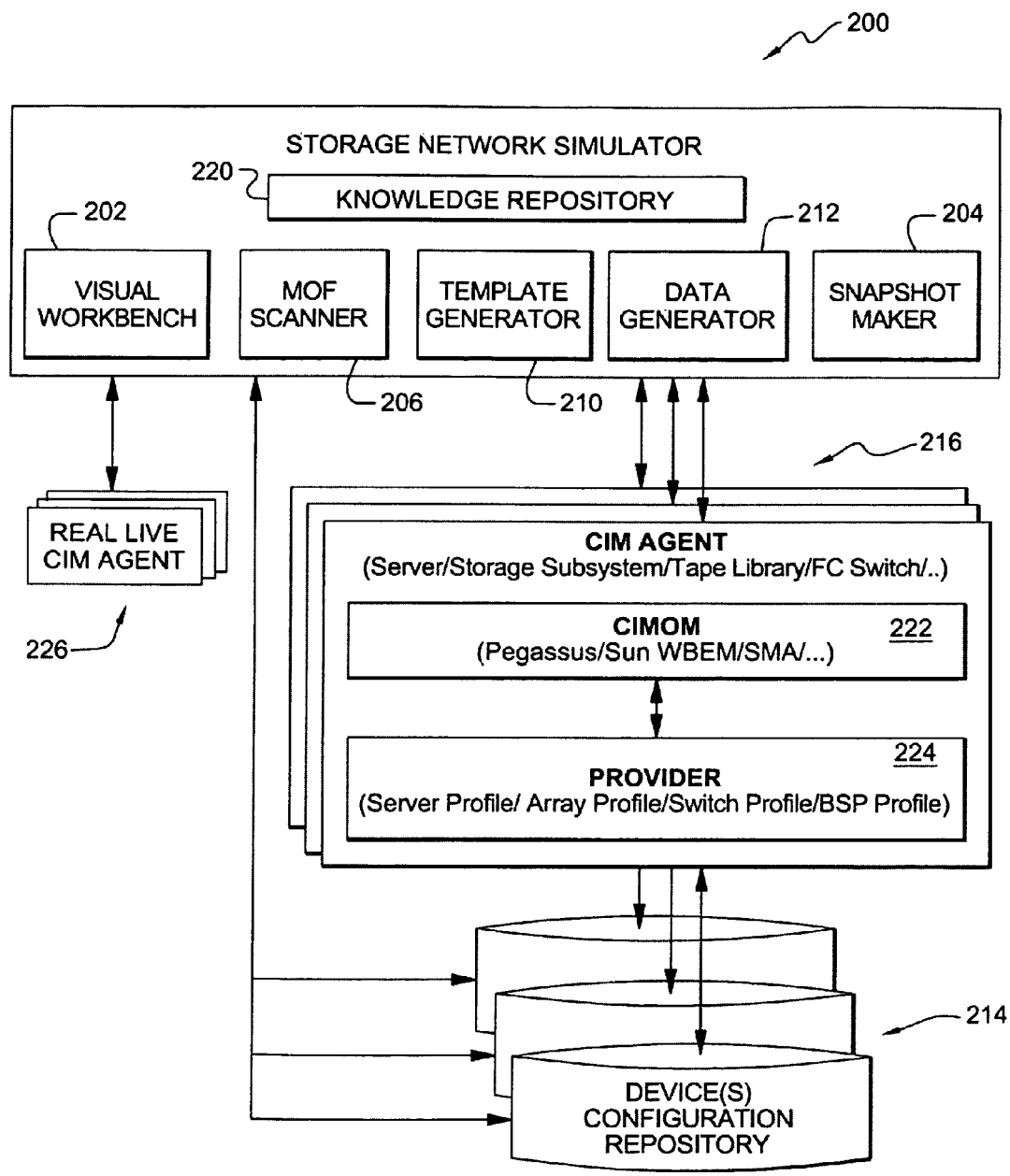
FIG. 2 shows the architecture of a preferred implementation of the present invention.

FIG. 2 illustrates the architecture 200 of the Storage Network Simulator. This architecture includes Visual Workbench 202, Snapshot Maker 204, MOF Scanner 206, Template Generator 210, Data Generator 212, device configuration repository 214, CIM Agents 216, and knowledge repository 220. Each CIM agent 216, in turn, includes a CIMOM 222 and a provider 224. The individual components of this preferred architecture are described below in detail.

Visual Workbench

Visual workbench 202 is a visual editor where user can specify the input for the Storage Network Simulator and visualize the generated virtual SAN. For snapshot approach, user specifies information about the real live CIM agent(s) 226. For configuration approach, user drags and drops SAN devices into the visual workbench and establishes connectivity. Also, certain level of random connectivity among devices can also be left for iSAN to determine. User specification from graphical description is converted into a XML document. This XML document depicts the devices, device configurations and their connectivity. SAN planners that take declarative requirement specifications and generate the SAN blueprint can also be plugged into the visual workbench. Once, an operational Storage Network Simulator environment is established, it can be visually tweaked for what-if-analysis.

Snapshot Maker

Snapshot Maker 204 takes the snapshot of any live CIM agent. Live device, CIM agent is basically a collection of CIM instances that realizes a collection of profiles. CIM instance is instance of a CIM class. Definition of CIM classes, supported profiles etc. are also exposed by CIM agent in a standard fashion. Based on these CIM agent definitions, snapshot maker scans the namespace(s). For each of the namespace, CIM instance(s) of all of the CIM classes are retrieved from the CIM agent by performing enumerateInstances API invocation. This invocation is performed by the CIM client that is embedded inside the Storage Network Simulator. Namespaces, CIM class names, enumerated CIM instances along with CIM objectpath(s) are cleansed, indexed and persisted in the device configuration repository. This component follows a very standard cookie-cutter approach that can snap shot any CIM agent. Enumeration of CIM instances are done with all expanded options:

```
enumerateInstances (
    CIMObjectpath OP_with_className_and_namespace,
    boolean deep = true,
    boolean localOnly = false,
    boolean includeQualifiers = true,
    boolean includeClassOrigin = true,
    String[ ] propertyList = null );
```

Cleansing of the retrieved instances involves formatting of the data with respect to the delivering CIMOM. Indexing of the information helps in replaying back the persisted information efficiently through the Storage Network Simulator provider. Definition of CIM classes that are represented in a MOF (Managed Object Format) is also compiled into the Storage Network Simulator CIMOM from the real live CIMOM. Details of MOF Scanner, Provider are described below.

This approach described so far assumes exclusive access of snapshot maker to the real CIM agent 226. However, real live CIM agent can be reflecting the changing configurations that might not be consistent across start time and end time of the snapshot process. So, to capture a consistent device configuration from the real CIM agent, device may be left untouched during the snapshot process. This process of snapshot making is called offline snapshot.

In certain scenarios, access to real live CIMOM access cannot be restricted only to the Storage Network Simulator snapshot maker during the snapshot process. So, to solve this problem, at the beginning of the online snapshot process, the Storage Network Simulator subscribes to CIM indications of all the instance creation, deletion and modifications. In the due course of CIM instances being copied by snapshot maker, if any instances are modified, the Storage Network Simulator copies the old data first to the device configuration repository before the instance gets modified in the real live CIM agent. CIM instances that get created after the beginning of the snapshot process do not get copied by the snapshot maker. CIM instances that are deleted after the beginning and before the end of the snapshot process get copied by the snapshot maker. Snapshot created using this process is called point-in-time snapshot. But, this approach is restricted by limitations of certain device CIM agents that are being snapshotted.

Creation of snapshot of CIM agents 216 reduce network latency of SRM testing frameworks significantly by presenting a virtual SAN in a local LAN. Also, this approach removes the constraint of SRM development and testing on SAN availability.

MOF Scanner

Snapshot maker persists the CIM instances from the live CIM agent. But, the CIM class definitions from real live CIMOM represented in Managed Object Format (MOF) also needs to be copied for compilation into the Storage Network Simulator CIMOM. During the snapshot process, CIM class definitions are also copied by MOF scanner 206 and compiled into the Storage Network Simulator CIMOM. The Storage Network Simulator also exposes a support matrix describing the device types, manufacturer and CIM agent versions that are supported. iSAN scans MOF files of the multi-vendor devices for each CIM agent version from real live CIM agents and stores them in its knowledge repository. MOF scanning involves retrieval of class definitions, class hierarchy, methods and qualifiers by use of CIM calls like enumerateClasses.

Template Generator

The Storage Network Simulator supports several types of devices to be dragged and dropped and interconnected in the visual workbench. Each device manufacturer exposes device information in compliance with CIM. But, vendor specific naming convention and internal device component arrangement are still proprietary. To be exact and close to the real devices, the Storage Network Simulator scans through the CIM instances of real live CIM agent and, using Template Generator 210, builds a template. These templates for different device types are stored in the knowledge repository 220 of the Storage Network Simulator. Each template is uniquely identified by a tuple: e.g., template (device=Storage Subsystem, type=model-2107, manufacturer=IBM, CIM Agent Version=5.0). Templates capture i) naming conventions ii) profiles supported iii) modeling and extension used by vendors for CIM entities—number of instances, associations iv) device control flow for configuration change action.

Generation of template is a continuous process. This process is similar to the process of automatically generating DTD/XML schema from a given XML document. Schema becomes more concrete and correct when it encounters a large variety of XML documents that conforms to the schema. Template generator is validated against CIM data of devices of same type and CIM agent version with a variety and range of configurations. Template can also be generated manually by discussing the structure of devices with device manufacturers. Template generated automatically gets verified by device manufactures before being certified for use. Sample portion of a template for class IBMTSESS_StorageSystem of IBM DS8000 Storage Subsystem CIM agent version 5.1.1 is shown below:

```
<Class Name="IBMTSESS_StorageSystem"
    Namespace="/root/ibm"
    NOI=""
    CfgExp="[NUMBER_OF_STORAGE_SYSTEM]">
    <Property Name="cache" Type="string"
        Random="false">
        <Value></Value>
    </Property>
    <Property Name="Caption" Type="string"
        Random="false">
        <Value>IBM TotalStorage DS8000</Value>
    </Property>
    <Property Name="codelevel" Type="string"
        Random="false">
        <Value>5.2.0.917</Value>
    </Property>
    <Property Name="CreationClassName"
        Type="string" Random="false"
        Key="true">
        <Value>IBMTSESS_StorageSystem</Value>
    </Property>
    <Property Name="Dedicated" Type="uint16[ ]"
        Random="false">
        <Value>3,15</Value>
    </Property>
    ......
</Class>
```

In the example given above, cfgExp is a pointer to the configuration parameters specified by the user. Template for the class IBMTSESS_DiskDrive given below captures the naming conventions:

```
<Class Name="IBMTSESS_DiskDrive"
    Namespace="/root/ibm"
    NOI=""
```

-continued

```
    CfgExp="[NUMBER_OF_EXTENTS]"
    AutoGenerate="false">
  <Property Name="DeviceID" Type="string"
      Random="true" Key="true"
      Multiple="true">
    <Value>6</Value>
    <Value>6</Value>
  </Property>
  <Property Name="Name" Type="string"
      Random="false" Refers="DeviceID"
      Prefix="Disk Drive ">
  </Property>
  <Property Name="InstanceID" Type="string"
        Random="false" Key="true"
        Refers="true" Multiple="true">
    <Value External="IBMTSESS_StorageSystem"
    Prefix="" Suffix="-">Name</Value>
    <Value Prefix="" Suffix="">DeviceID
    </Value>
  </Property>
  <Property Name="TargetAddress" Type="string"
        Random="true" Prefix="" Suffix=""
        Separator="." Multiple="true">
    <Value>3</Value>
    <Value>3</Value>
    <Value>3</Value>
    <Value>3</Value>
  </Property>
</Class>
```

Data Generator

Figure 3:
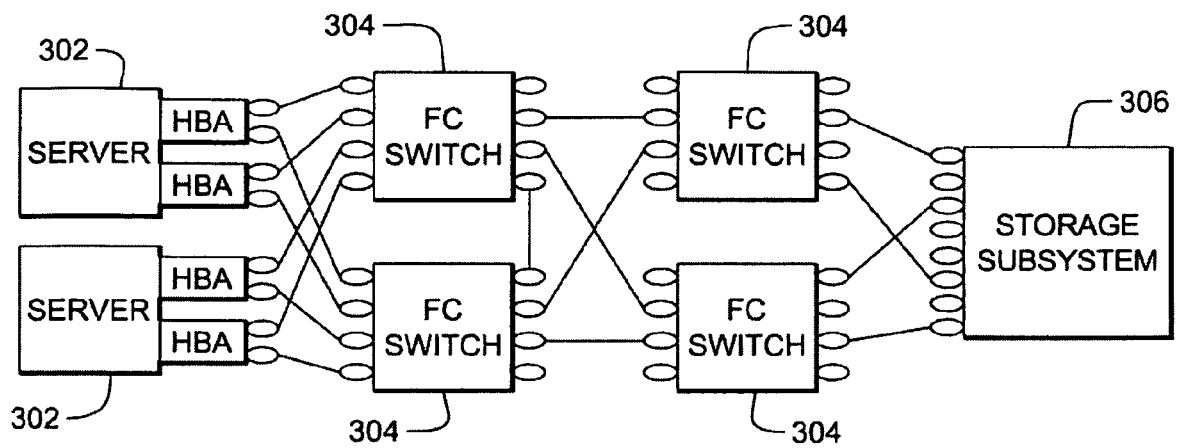
FIG. 3 illustrates a storage area network with no single point of failure connectivity.

As described above, MOF definitions of classes and template describing the modeling structure of devices are available in knowledge repository. Based on these available capabilities, user is allowed to drag and drop devices into the visual workbench to construct a SAN. Once, the specification of SAN is obtained as user input through the workbench, data needs to be generated to support the device configurations. The data generator 212 deals with generation of data based on SAN configuration specification. User specifies low-level specifications for each device connected in the SAN along with the device connectivity. Consider, as depicted in FIG. 3, an example scenario, where the user connects two servers 302 to a fabric that contains four fiber channel switches 304 and one storage subsystem 306. This is a basic SAN with a no-single-point-of-failure connectivity of server to storage.

Detailed configuration about each individual entity can also be specified through the visual workbench 202. Connectivity with device configuration created through the visual workbench generates a XML document. Detailed information in this regard is explained below.

Fiber channel port connectivity between SAN devices can be done using one of the following approaches: i) user explicitly specifies the connectivity between ports by using the visual workbench primitives; ii) user can opt for a random connectivity decided by the Storage Network Simulator; and iii) output of planners can be integrated with the Storage Network Simulator, e.g., SRM planners provide connectivity template for nosingle-point-of-failure.

Based on the user input, the Storage Network Simulator picks the appropriate template from the knowledge base and generates the CIM data required to represent the device configurations. It is important to note that generated data for different CIM agents need to be correlated to represent the SAN in a cohesive fashion. For example, ProtocolEnpoint along with ActiveConnection information from FC switch CIM agent needs to be correlated with server and storage subsystem. LUN information from server must be correlated with Volume information from storage subsystem. Zone configuration information of fabric must be correlated with server and storage ports.

CIM instances generated by data generator component are persisted in a persistent data store called device configuration repository. Generated data could be persisted in one or multiple repositories. At this point, CIM agent becomes operational based on the supplied specification. But, data generator also continuously modifies the data in the repositories due to the control operations (e.g. creation of volume in a storage subsystem would require an addition of StorageVolume, modification of attributes of StoragePool, indication about the creation of new volume, creation of associations like AllocatedFromStoragePool etc. . . . ). Also, for support of Block Server Performance (BSP) profile and switch profile, data generator continually populates the repositories with required information using a background daemon thread.

Generated data is served back to consumers like SRM software through providers.

Device Configuration Repository

CIM information collected using snapshot approach or generated CIM information using configuration approach is persisted in one or multiple device configuration repositories 214. This repository can be simply a set of files or can be a relational database. CIM instances stored in repository can be i) serialized objects on files ii) instance shredded into properties and values in file/database iii) BLOBs in database. We have used database as repository and stored CIM instances as BLOBs due to scalability and performance reasons. At a very high level, repository contains following four categories of information linked together: Information about the connectivity and credentials of the CIM agent; Information about the namespace(s) associated with the CIM agent; Information about CIM classes associated with the namespace; and Information about the CIM data (CIM objectpath, CIM instance) associated with the CIM classes. Multiple repositories can be seamlessly merged.

Provider

CIM providers 224 are the pluggable modules that get plugged into the CIMOM 222 for device operations. The Storage Network Simulator includes a set of providers to serve data out of the repository based on the types of open source CIMOMs. Due to the relational nature of the repository, CIM providers of the Storage Network Simulator also match to SQL queries. The Storage Network Simulator implements instance provider, association provider, method provider and indication provider.

Knowledge Repository

Knowledge Repository 220 is a set of MOF files and templates stored persistently for use of the Storage Network Simulator. Based on the contained data in the repository, visual workbench exposes a support matrix of supported devices that can be used for construction of virtual SAN. A device of any given type is manufactured by multiple vendors. Vendors release device CIM agents very frequently to be in line with the fast changing CIM specifications and device capabilities. So, MOF files are stored for each device manufactured by certain vendor for a given release.

Figure 4:
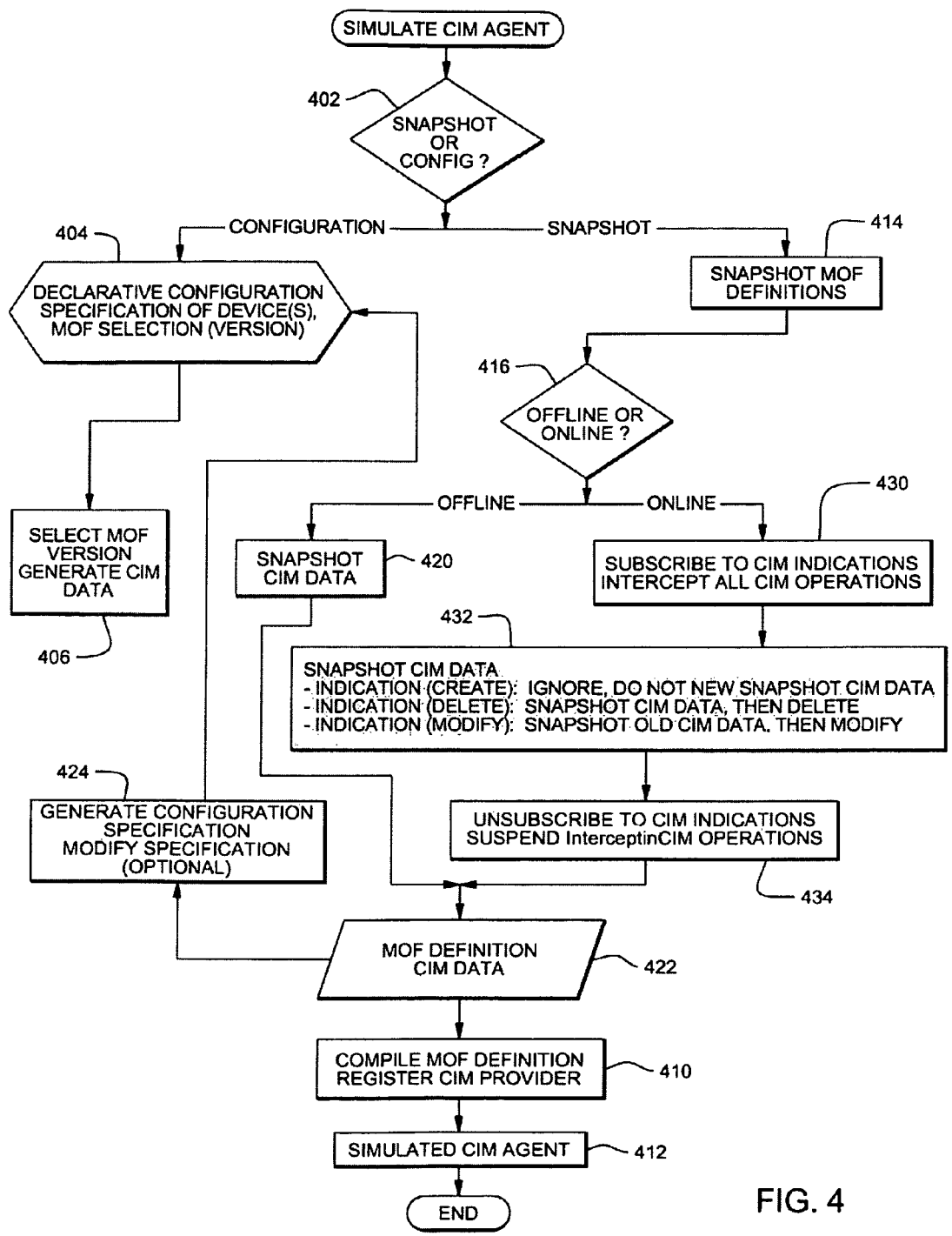
FIG. 4 is a flow chart illustrating a preferred implementation of this invention.

FIG. 4 illustrates a preferred procedure using the Storage Network Simulator for simulating a CIM agent. As represented at step 402, there are two ways to simulate an agent: the configuration approach and the snapshot approach. If the configuration approach is taken, then at step 404, the user declares the configuration specifications of the devices and the MOF selection. Then, at step 406, the user selects the MOF version and generates the CIM data. After this, at step 410, the MOF definition is compiled and the CIM provider is registered, resulting in a simulated CIM agent, as represented at 412.

If the agent is simulated using the snapshot approach, then, from step 402, the Storage Network Simulator goes to step 414, where a snapshot is taken of the MOF definitions. As represented at 416, the snapshot of the CIM data can be taken either offline or online. If the snapshot is to be taken offline, the Storage Network Simulator proceeds to step 420, where the snapshot is taken. Then, at step 422, the MOF definition and CIM data are obtained. If need be, the configuration specification is configured and modified at step 424; and from this step, the Storage Network Simulator proceeds through steps 404 and 406 to step 410. If there is no need to generate the configuration specification, the Storage Network Simulator can go directly to step 410 from step 422.

If the snapshot of the CIM data is taken offline, then, from step 416, the Storage Network Simulator goes to step 430. At this step, the Storage Network Simulator subscribes to CIM indication and intercepts all CIM operations. Then, at step 432, a snapshot of the CIM data is taken. As discussed above, if any instances are modified, the Storage Network Simulator copies the old data first to the device configuration repository before the instance gets modified in the real time CIM agent. CIM instances that get created after the beginning of the snapshot process do not get copied by the snapshot maker; and CIM instances that are deleted after the beginning and before the end of the snapshot process get copied by the snapshot maker.

After the snapshot is complete, the Storage Network Simulator goes to step 434, where the Storage Network Simulator unsubscribes to CIM indications and suspends interceptions of CIM operations. From step 434, the Storage Network Simulator goes to step 422, discussed above; and from step 422, the Storage Network Simulator proceeds to step 410, either directly or via steps 424, 404 and 406.

Experimental evaluations criteria are discussed below. These criteria focus on the correlation of different types of CIM agents that combined together represent a heterogeneous SAN. Types of device simulation currently used include Server, Host bus Adapter, Fiber Channel Switch, Storage subsystem and Tape Library. For each of these devices, templates were compiled for multiple versions from multiple vendors.

Configuration of each device that was specified using the visual workbench captured information of the following nature:

```
Server [
    Type = eSeries Model = 1849
    Processor = Intel Xeon
    Software = MS Office, WAS
    Manufacturer = IBM
    OS = Windows 2003
    HBA [
        Type = QLA2460 Model = CK
        Manufacturer = QLogic
        Port = 2
    ]
]
Fabric [
    ZoneConfig = [
        ZoneSet = composition
        Zone = composition
        ZoneMember = composition
        ...
    ]
    FC Switch [
        Type = 4100 Model = Silkworm
        Manufacturer = Brocade
        Port = 8 NUM = 4
    ]
]
```

-continued

```
StorageSubsystem [
    Type = 800 Model = 2107
    Manufacturer = IBM
    StorageExtents = composition
    StoragePools = extent composition
    StorageVolumes = composition
    MaskingMapping = composition]
Connectivity [
    visually wired / random / planner
]
```

Data generators generated data for the 43 devices and hosted the simulated CIM agents on four servers.

For Block Server Performance profile and switch port statistics, the Storage Network Simulator updates the device repositories on a periodic basis.

Control functions or CIM extrinsic methods were also implemented in the Storage Network Simulator providers. Examples of some of the control functions are: creation/deletion of Volumes and Pools on a storage subsystem, creation of Zone, ZoneSet, addition/removal of Zone to ZoneSet or ZoneMember to Zone etc. Indication generation was also integrated.

Information like ProtocolEndpoint, LUN etc. . . . exposed by the server, switch and storage subsystem CIM agents were in sync with one another.

Figure 5:
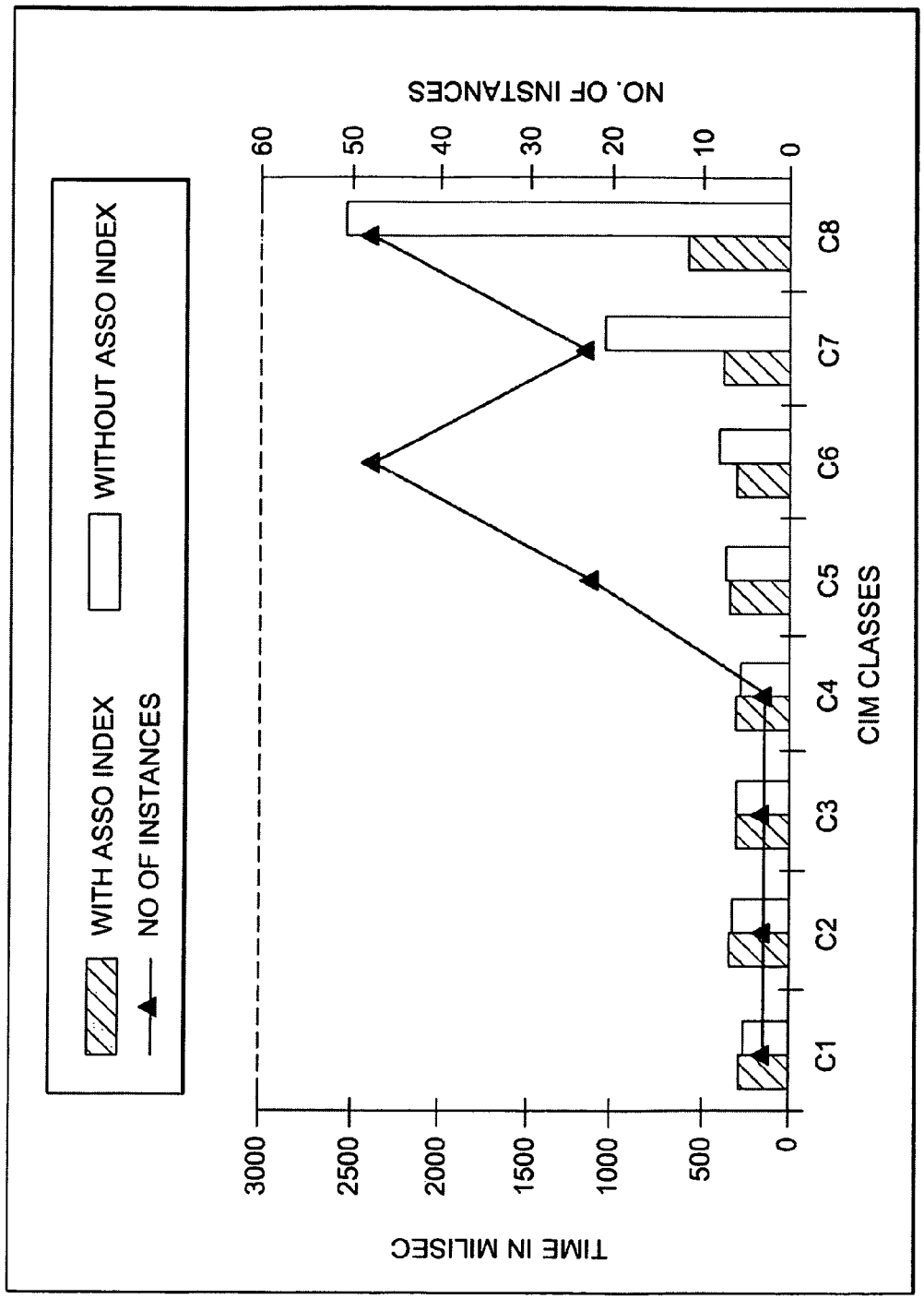
FIG. 5 illustrates the effect of indexing by using the present invention.

In addition to the CIM defined indexes, the Storage Network Simulator indexing contributed to a faster association and reference provider with an additional one-time cost of generating the indexes during snapshot. A comparative analysis is described in FIG. 5.

Based on the generated data, we ran the analytic tools offered by TPC were run to check for any best practice violation. System administrators can take snapshot of their existing environment and then extend it using the Storage Network Simulator to the planned environment. High-level analytics like configuration analysis can then be performed on the projected environment. Visual workbench allows this mode of what-if-analysis. Otherwise, users can provide the configuration of their projected environment to the Storage Network Simulator to generate what-if-analysis.

The preferred embodiment of the invention provides a number of important advantages. By simulating CIM agents of multiple SAN devices in a collective fashion, virtual SAN can be exposed to a SRM suite. SRM suites can use the Storage Network Simulator for the following purposes: visual workbench to drag and drop different devices and connect them together to get a virtual SAN from management perspective; SRM suite can perform regular management functions like discovery, configuration and monitoring on the virtual SAN as if it is a real SAN; planning of a SAN from scratch or extension of an existing SAN in a virtual environment to perform what-if-analysis; impact analysis against fault injection or growth pattern in a temporal fashion; minimize network latency by presenting a virtual SAN close to the management server; and snapshot any real live CIM agent and replay it using the Storage Network Simulator's record-replay mechanism.

It is important to note that the virtual SAN with the above features brings in significant value add to the management suite because these tools never really require the existence of a real heterogeneous SAN for it's development and testing.

Also, simulation of core entities like disk subsystems and network switches can be combined with the management module simulation of this invention for a complete device simulation. Planning or modeling tools can be integrated with the visual workbench to transform declarative user input to required SAN blueprint. SNMP and any other vendor specific management modules can be plugged into the Storage Network Simulator. Analytical models can then be built into these complete device simulators for performance bottleneck analysis, application impact analysis, fault injection and analysis.

In addition, the framework provided by the preferred embodiment of the invention removes the dependency of costly SAN hardware from Storage Resource Management suites. Developments, test tool of SRM suites, what-if-analysis task of administrators are the key contributions of the Storage Network Simulator. Also, this tool can be integrated with core device simulators for complete device simulation.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of simulating a storage area network including a set of correlated devices, each of the devices having a device agent, the method comprising:
    forming a set of simulation agents representing said device agents, including the steps of,
    i) for each of the simulation agents, obtaining a set of agent profiles in a first mode using a snapshot approach and in a second mode using a configuration approach, and storing said agent profiles in a data store, and
    ii) obtaining files describing class definitions for the simulation agents, and storing said files in the data store; and
    producing a display of said simulation agents wherein the device agents include profiles, and the step of obtaining a set of agent profiles includes the steps of: taking snapshots of the profiles of the device agents to obtain snapshot profiles; cleansing, indexing and persisting the snapshot profiles in the data store; keeping the agent profiles of the device agents unchanged during the step of taking snapshots, and combining snapshots of the profiles of individual ones of the device agents.

2. The method according to claim 1, wherein the step of obtaining a set of agent profiles includes the step of using user provided information to generate said agent profiles.

3. The method according to claim 2, wherein the step of obtaining a set of agent profiles includes the further step of using device templates to generate said agent profiles.

4. The method according to claim 3, wherein the step of using said device templates includes the step of generating the device templates from information obtained from the manufacturers of the devices.

5. The method according to claim 1, wherein the step of storing the agent profiles includes the step of storing the agent profiles in a device configuration repository.

6. The method according to claim 1, wherein the step of storing said files includes the step of storing said files in a knowledge repository.

7. A method of simulating a storage area network including a set of correlated devices, each of the devices having a device agent, the method comprising the steps of:
    forming a set of simulation agents representing said device agents, including the steps of,
    i) for each of the simulation agents,
    obtaining a set of agent profiles, and
    storing said agent profiles in a data store, and
    ii) obtaining files describing class definitions for the simulation agents, and storing said files in the data store; and
    producing a display of said simulation agents,
    wherein the device agents include profiles, and the step of obtaining a set of agent profiles includes the step of taking snapshots of the profiles of the device agents to obtain snapshot profiles; cleansing, indexing and persisting the snapshot profiles in the data store; keeping the agent profiles of the device agents unchanged during the step of taking snapshots, and combining snapshots of the profiles of individual ones of the device agents.

8. A system for simulating a storage area network including a set of correlated devices, each of the devices having a device agent, the system comprising:
    a simulation agent former to form a set of simulation agents representing said device agents by obtaining, for each of the simulation agents, a set of agent profiles in a first mode using a snapshot approach and in a second mode using a configuration approach;
    a file scanner to obtain files describing class definitions for the simulation agents;
    data storage for storing said agent profiles and said files; and
    a visual workbench for generating a display of the simulation agents wherein the device agents include profiles, and the step of obtaining a set of agent profiles includes the steps of: taking snapshots of the profiles of the device agents to obtain snapshot profiles; cleansing, indexing and persisting the snapshot profiles in the data store; keeping the agent profiles of the device agents unchanged during the step of taking snapshots, and combining snapshots of the profiles of individual ones of the device agents.

9. The system according to claim 8, wherein the simulation agent former uses user provided data to generate said agent profiles.

10. The system according to claim 8, wherein the data storage includes a device configuration repository to store the agent profiles, and a knowledge repository to store said files.

11. A system for simulating a storage area network including a set of correlated devices, each of the devices having a device agent, the system comprising:

a simulation agent former to form a set of simulation agents representing said device agents by obtaining, for each of the simulation agents, a set of agent profiles;

a file scanner to obtain files describing class definitions for the simulation agents;

data storage for storing said agent profiles and said files; and a visual workbench for generating a display of the simulation agents, wherein the device agents include profiles, and the simulation agent former includes a Snapshot Maker for taking snapshots of the profiles of the device agents to obtain snapshot profiles; cleansing, indexing and persisting the snapshot profiles in the data store; keeping the agent profiles of the device agents unchanged during the step of taking snapshots, and combining snapshots of the profiles of individual ones of the device agents.

12. A tangible computer readable storage media, tangibly embodying a program of instructions executable by the computer to perform method steps for simulating a storage area network including a set of correlated devices, each of the devices having a device agent, the method steps comprising:

forming a set of simulation agents representing said device agents, including the steps of:

i) for each of the simulation agents, obtaining a set of agent profiles in a first mode using a snapshot approach and in a second mode using a configuration approach, and storing said agent profiles in a data store, and ii) obtaining files describing class definitions for the simulation agents, and storing said files in the data store; and producing a display of said simulation agents; cleansing, indexing and persisting the snapshot profiles in the data store; keeping the agent profiles of the device agents unchanged during the step of taking snapshots, and combining snapshots of the profiles of individual ones of the device agents.

13. The tangible computer readable storage media according to claim 12, wherein the step of obtaining a set of agent profiles includes the steps of: using user provided information to generate said agent profiles; and using device templates to generate said agent profiles.

14. The tangible computer readable storage media according to claim 12, wherein the step of storing the agent profiles includes the step of storing the agent profiles in a device configuration repository.

15. The tangible computer readable storage media according to claim 12, wherein the step of storing said files includes the step of storing said files in a knowledge repository.

16. A tangible computer readable storage media, tangibly embodying a program of instructions executable by the computer to perform method steps for simulating a storage area network including a set of correlated devices, each of the devices having a device agent, the method steps comprising:

forming a set of simulation agents representing said device agents, including the steps of:

i) for each of the simulation agents, obtaining a set of agent profiles, and storing said agent profiles in a data store, and ii) obtaining files describing class definitions for the simulation agents, and storing said files in the data store; and producing a display of said simulation agents, wherein the device agents include profiles, and the step of obtaining a set of agent profiles includes the steps of: taking snapshots of the profiles of the device agents to obtain snapshot profiles; cleansing, indexing and persisting the snapshot profiles in the data store; and keeping the agent profiles of the device agents unchanged during the step of taking snapshots, and combining snapshots of the profiles of individual ones of the device agents.

* * * * *